United States Patent [19]
Malik et al.

[11] Patent Number: 5,644,608
[45] Date of Patent: Jul. 1, 1997

[54] COOLING SYSTEM FOR SPENT FUEL POOL

[75] Inventors: Paul Malik, Northport; Robert Kosson, Massapequa, both of N.Y.; Michael Vasely, 21 Newhard Pl., Hopewell Junction, N.Y. 12533; George Stegmann, Thornwood, N.Y.

[73] Assignees: Consolidated Edison Company of New York, New York, N.Y.; Michael Vasely, Hopewell Junction, N.Y.

[21] Appl. No.: 452,276

[22] Filed: May 26, 1995

Related U.S. Application Data

[62] Division of Ser. No. 294,072, Aug. 22, 1994, Pat. No. 5,488,642.

[51] Int. Cl.$^6$ .................................................. G21C 19/07
[52] U.S. Cl. ........................... 376/272; 376/298; 165/911; 261/153
[58] Field of Search ............................ 376/272, 298, 376/299; 165/900, 911, 912; 261/153

[56] References Cited

U.S. PATENT DOCUMENTS

| | | | |
|---|---|---|---|
| 3,775,993 | 12/1973 | Murphy | 62/95 |
| 4,443,389 | 4/1984 | Dodds | 261/153 |
| 4,944,344 | 7/1990 | Crowe | 165/104.33 |
| 4,969,507 | 11/1990 | Rosenblad | 165/1 |
| 5,129,446 | 7/1992 | Beamer | 261/153 |
| 5,311,931 | 5/1994 | Lee | 165/911 |

*Primary Examiner*—Daniel D. Wasil
*Attorney, Agent, or Firm*—Brooks Haidt Haffner & Delahunty

[57] ABSTRACT

The performance of a compact heat exchanger in which a flow of air is employed to cool a flow of water can be enhanced by spraying water as a fine mist into the stream of coolant air. The water droplets, preferably less than 100 microns in diameter, coat the heat exchanger surface on the air side of the heat exchanger and provide evaporative cooling. The preferred form of heat exchange surface has strip fins.

9 Claims, 3 Drawing Sheets

COOLING SYSTEM FOR SPENT FUEL POOL

This application is a division of application Ser. No. 08/294,072, filed Aug. 22, 1994, now U.S. Pat. No. 5,488,642.

This invention relates to the cooling of spent fuel assemblies used in nuclear power plants.

BACKGROUND OF THE INVENTION

In nuclear power plants, it is customary to provide a pool of water for the purpose of cooling spent fuel assemblies, which are immersed in the pool of water. It is necessary to circulate and cool the water of the pool, and in most installations, a water-water heat exchanger is used to cool both the water from the spent fuel pool and the water that is used to cool components of the reactor. The component cooling water is circulated through the water-water heat exchanger through which the water from the pool is also circulated.

Such water-water heal exchangers are relatively large and expensive, and the ultimate cooling therefor is obtained from a service water system, such as a river, lake or other source. If there is a loss of supply of water from the service water system, or if the water-water heal exchanger becomes inoperative, the spent fuel cooling system is inoperative.

Also, with the present systems, the time allotted for repair of the component cooling system and the service water system is usually limited to the reactor refueling time during which all of the fuel assemblies from the reactor core are also in the spent fuel pool. Such time is on the order of twelve hours and can be inadequate.

There exists a need to provide a redundant cooling system in order to permit repair of the main cooling system or to act as a standby system.

To provide a redundant water-water heat exchanger to handle the cooling load in the event of such a failure or problem or during refueling is considered to be prohibitive not only because of cost and space limitations, but also because a redundant water-water system would not provide protection against loss of service water or component cooling water systems.

The use of a conventional air cooled heat exchanger as a redundant cooler is also impractical because such an exchanger is relatively inefficient, and to provide the same cooling capacity as the water-water heat exchanger would require a large installation.

It is known in the art that heat exchangers which employ pipe coils through which the liquid to be cooled is to circulate and which are subjected to a flow of air, such as ambient air, into which a spray of water is directed, are more efficient in cooling than heat exchangers which use only ambient air without a water spray for cooling.

Compact plate-fin heat exchangers have been used, for example in aircraft. Such heat exchangers provide greater heat transfer surface per unit volume by the use of fins of very small cross section brazed or otherwise attached in good thermal contact with the primary heat transfer surface. The two principal arrangements employing extended surfaces are the plate-fin exchanger, which has no pipe coils, and the tube-fin exchanger. The primary heat transfer surface of the plate-fin design consists of multiple parallel plates connected by fins; the space between each pair of plates comprises a fluid passage. Alternate fluid passages are connected in parallel by suitable headers to form the two "sides" of the heat exchanger. In the strip-fin type of plate-fin exchanger, metal strips arranged either staggered or in-line serve as the fins.

Tube-fin heat exchangers have fins on only one side of the primary surface, and tubes (either round or flattened) placed through holes in thin metal plates and to which the tubes are brazed. The preferred heat exchanger of the present invention has fins on both sides of the heat transfer surface and employs no tubes.

U.S. Pat. No. 4,969,507 describes a falling film air-cooled surface condenser in which droplets of coolant liquid are detached from the falling film of water and entrained by a flow of coolant air, enhancing heat exchange.

It has now been found that a heat exchanger of reasonable size and cost and which uses, as the coolant, ambient air into which a spray of water is directed concurrently with the flow of cooling air, can be used not only to substitute for the conventional water-water heat exchanger in the event the latter becomes inoperative, but also to provide component and spent fuel cooling in the event of failure of the water supply to the component cooling system, and hence, to the spent fuel water-water heat exchanger.

BRIEF SUMMARY OF THE INVENTION

In accordance with the invention, a plate-fin or tube-fin heat exchanger through which the water to be cooled is circulated and which employs a flow of air such as ambient air into which water from an auxiliary source, such as a storage tank, public water mains, river or lake, is sprayed, can, by means of appropriate valves and pipes, be employed, at least temporarily, as a substitute for the conventional water-water heat exchanger, as a supplemental cooler or as a heat exchanger for component cooling water and the spent fuel pool water in the event that the normal supply of water for such latter purposes fails. Accordingly, a heat exchanger or heat exchanger assembly with a set of individual plate-fin or tube-fin cooling surfaces, employing as the coolant an air-water spray and having a cooling capacity at least equal to the cooling capacity of the conventional water-water heat exchanger, is connected by valves and pipes to the conventional system so that:

(1) The water-water heat exchanger is isolated from the spent fuel pool cooling loop and cooling is done by the air-water spray coolant heat exchanger; or (2) The air-water spray coolant heat exchanger is connected and operated in parallel with the water-water heat exchanger to provide supplemental cooling, in such situations as when there is a discharge of the reactor core or when the service water temperature is abnormally high; or (3) The air-water spray coolant heat exchanger provides cooling of the spent fuel pool water and the component cooling water system which cools the reactor components in such situations as when there is a failure of service water supply.

The preferred air-water spray coolant heat exchanger of the invention achieves a significantly higher effectiveness than heat exchangers previously known. The term effectiveness as used in this description means the ratio of the actual temperature decrease of the fluid being cooled to the maximum theoretical temperature decrease which can be achieved with a coolant medium of a given temperature. To accomplish this effectiveness it is necessary to employ spray nozzles which produce very finely "atomized" water droplets which form a mist uniformly distributed within the heat exchanger. The effectiveness of the cooling can be greatly increased by using a mist of fine water droplets entrained in cooling air passed through the heat exchanger. Effectiveness can be increased as much as eight times as compared to cooling with air as the sole cooling medium. The mean diameter of the individual water droplets should be no greater than 240 microns, preferably less than 100 microns. The particularly preferred average water droplet diameter is about 50 microns.

The spray of water is not directed through any slots or openings. The water spray in the form of very fine mist is injected into the air stream entering the heat exchanger as a result of the suction produced by a fan. The spray droplets are driven by small scale turbulence within the heat exchanger to collect on the fin and plate surfaces, providing a thin film of liquid which evaporates, transferring heat. When the temperature of the air stream as it enters the heat exchanger goes down slightly as a result of the presence of the water mist, the evaporative heat transfer from the air to the mist droplets significantly enhances the overall heat transfer from the water to be cooled by the heat exchanger.

The heat exchanger can be of either the tube-fin or the plate-fin type. Preferably, the plate-fin type of heat exchange surface with either strip fins or louvered fins is used. Such surfaces are described in the reference textbook Compact Heat Exchangers by Kays and London, McGraw Hill, second edition, 1954 in Chapter 9 and illustrated in FIGS. 9-3, 9-5 and 9-6 of that text, which sections and figures are herein incorporated by reference.

BRIEF DESCRIPTION OF THE DRAWINGS

The invention will be better understood from the following detailed description of the invention, which description should be considered in conjunction with the accompanying drawings in which:

FIG. 2a is a sectional view taken along line a—a of FIG. 2b.

DETAILED DESCRIPTION OF THE INVENTION

Although the principles of the invention are applicable to other cooling systems, the invention will be described in connection with a known type of spent fuel and reactor component cooling system. Such a system is illustrated in the accompanying drawings along with the added apparatus of the invention.

Figure 1:
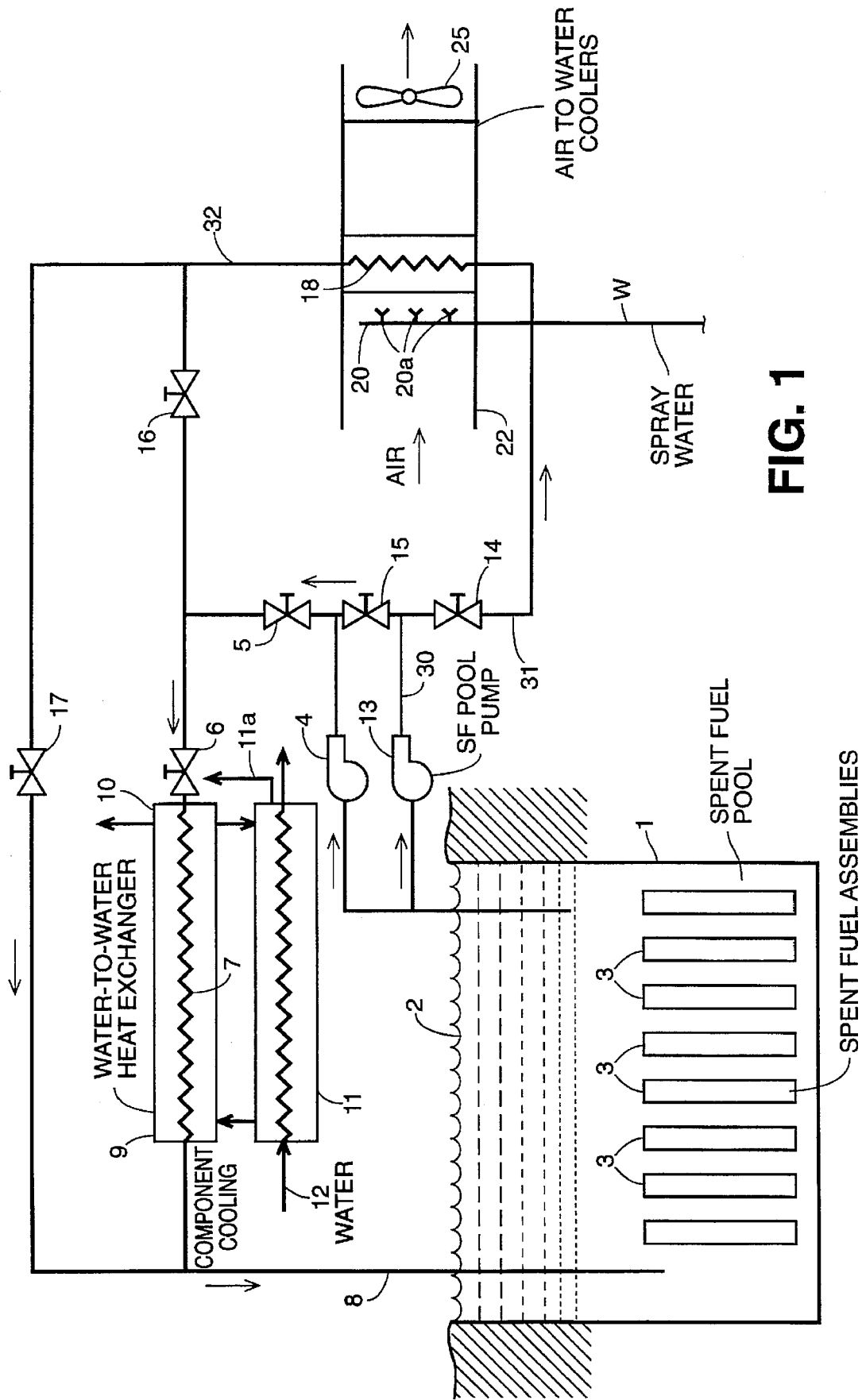
FIG. 1 is a diagrammatic illustration of a known type of spent fuel and reactor component cooling system to which the apparatus of the invention has been added.

As shown in FIG. 1, the known system comprises a spent fuel pool 1 filled with water 2 which can contain additives of a known type. Spent radioactive fuel assemblies 3 which have been removed from a reactor, not shown, are immersed in the pool of water 2. The water 2 must be kept at a temperature well below its boiling temperature, and the water 2 is cooled by pumping it out of the pool 1 by means of a pump 4 and sending it through pipes and valves 5 and 6 to a water conduit assembly 7, which can be a plurality of tubes, from which it returns to the pool 1 by way of a pipe 8. In a conventional cooling system, the assembly 7 through which the water 2 from the spent fuel pool is circulated is contained in a water-tight housing 9 of a heat exchanger 10 which receives and returns cooling water from and to another heat exchanger 11 of known construction which forms part of a cooling system for reactor components, e.g. reactor coolant pumps. Cooling water from a suitable source, e.g. a river, is supplied by a line 12 to the heat exchanger 11 and then dumped back to the source via line 11a. In the arrangement of the invention, the water from the spent fuel pool can be passed through the conventional heat exchanger 9, or the conventional heat exchanger can be bypassed, or the conventional heat exchanger and the heat exchanger of the invention can both be used.

As examples of the spent fuel pool water cooling which can be required, it can be necessary to remove 13 million BTU/hour, 131 hours after a third of the reactor fuel assemblies are immersed in the water 2 and 12 million BTU/hour, 174 hours after such immersion of the assemblies. In a full core discharge case, i.e. when all of the reactor fuel assemblies are immersed in the water 2, the heat removal rate can be as much as 26 million BTU/hour, 360 hours after immersion of the assemblies in the water 2.

When the reactor is shut down for maintenance and refueling, all of the assemblies are transferred from the reactor to the spent fuel pool. The procedure can take about twelve hours, which provides only a relatively short time for the maintenance or repair of the service water/component cooling system.

Also, if there is a failure of the component cooling system 11 or the supply of water by way of the line 12, the reactor operation must be discontinued, and there would be a loss of spent fuel pool water cooling.

In accordance with the invention, these problems can be overcome by the addition of the apparatus described hereinafter without a substantial modification of the known system, and with equipment of relatively small size and cost as compared to the size and cost of a conventional water-water heat exchanger such as the heat exchanger 10. The heat exchanger which is added in accordance with the present invention also is more reliable than a water-water heat exchanger.

In the preferred embodiment of the invention, the added apparatus comprises a pump 13, valves 14, 15, 16 and 17, a heat exchanger 18 which uses air and water spray for the coolant and the interconnecting pipes shown in the drawing. The heat exchanger unit 18 comprises a spray water conduit W, a duct 22, one bank 20 of water spray heads or nozzles 20a and a fan 25. Air is supplied to the duct 22 from any convenient source, which can be the known spent fuel ventilation system normally used in the known cooling system, and water is supplied through the conduit W to the nozzles or spray heads 20a of the bank 20 from any convenient source thereof, e.g. public water mains, but preferably, the water is supplied thereto from a storage tank so that the spray water is always available and is independent of other sources which can more readily fail.

When valves 14 and 17 are open and valves 5 and 6 are closed, water 2 of the spent fuel pool is circulated by the pump 13 and is returned to the pool 1 by way of the interconnecting pipe lines 30, 31, 32, as shown by the arrows in FIG. 1. As the water 2 passes through the heat exchange unit 18, a stream of air driven by the fan 25 impinges on the heat exchange surfaces, and water is sprayed into the flow of air and onto the unit 18 from the spray head nozzles 20a of bank 20 to thereby remove heat from the water 2. With the temperature of the water 2 at 150° F., with the temperature of the ambient air entering the duct 22 at 75° F., the heat exchanger 18 can remove heat from the water 2 in an amount equal to about 22 million BTU/hour.

For this result, the operating conditions of the heat exchanger are as follows:

| | |
|---|---|
| Air flow rate through duct 22 | 72,000 cfm |
| Total water flow through unit 18 | 2,250 g./min. |
| Air flow area | 180 sq.ft. |
| Air flow velocity | 900 ft./min. |
| Spray water flow | 120 g./min. |

About one-third of the water sprayed into the air stream is being evaporated to achieve the above result. If a larger fraction of the sprayed water is evaporated, the cooling effect will be enhanced.

If the temperature of the air entering the duct 22 is lower, the amount of heat removed under the same conditions is greater.

Let it be assumed that the heat exchanger 10 for the spent fuel water 2 is not available for cooling the water 2 or that the component cooling heat exchanger 11 or cooling water supplied from a river or other source by the line 12 is not available (first case), and that the heat removal requirements are 22 million BTU/hour. With the heat exchanger 18 and the operating conditions thereof described hereinbefore, the added equipment of the invention can assume the entire cooling load under the following conditions:

| Component | Condition |
|---|---|
| Pump 13 | Operating |
| Valve 14 | Open |
| Valve 5 | Closed |
| Valve 16 | Closed |
| Valve 17 | Open |
| Valve 6 | Closed |
| Valve 15 | Open or closed |

Let it be assumed that the heat exchanger 10 is operative but that supplemental cooling is required (second case), such as in the full discharge case previously described. With the heat exchanger 18 and the described operating conditions thereof, the added equipment can provide supplemental cooling with the components in the following conditions:

| Component | Condition |
|---|---|
| Pumps 4 and 13 | Operating |
| Valve 14 | Open |
| Valve 5 | Open |
| Valve 16 | Closed |
| Valve 17 | Open |
| Valve 6 | Open |
| Valve 15 | Closed |

Let it be assumed that the supply of water by the line 12 is lost and that it is desired to continue cooling of the water 2 and the reactor components, e.g. pump seals, etc. (third case). With the heat exchanger 18 and the described operating conditions thereof, the added equipment of the invention can provide such cooling with the components set as follows:

| Component | Condition |
|---|---|
| Pump 13 | Operating |
| Valve 14 | Open |
| Valve 5 | Closed |
| Valve 16 | Open |
| Valve 17 | Closed |
| Valve 6 | Open |
| Valve 15 | Open or closed |

Although not preferred, the added apparatus can be simplified by the elimination of the pump 13 and the valve 15, the valve 14 being connected directly to the pump 4 and the valve 5. For that modified apparatus, in the first case assumed hereinbefore, the heat exchanger 18 can assume the entire cooling load with the components set as follows:

| Component | Condition |
|---|---|
| Pump 4 | Operating |
| Valve 14 | Open |
| Valve 5 | Closed |
| Valve 16 | Open or closed |
| Valve 17 | Open |
| Valve 6 | Closed |

In the second case assumed hereinbefore, the modified apparatus can supply supplemental cooling with the components set as follows:

| Component | Condition |
|---|---|
| Pump 4 | Operating |
| Valve 14 | Open |
| Valve 5 | Open |
| Valve 16 | Open or closed |
| Valve 17 | Open |
| Valve 6 | Open |

In the third case assumed hereinbefore, the modified apparatus can continue cooling of the water 2 and the reactor components with the components set as follows:

| Component | Condition |
|---|---|
| Pump 4 | Operating |
| Valve 14 | Open |
| Valve 5 | Closed |
| Valve 16 | Open |
| Valve 17 | Closed |
| Valve 6 | Open |

Figure 2A:
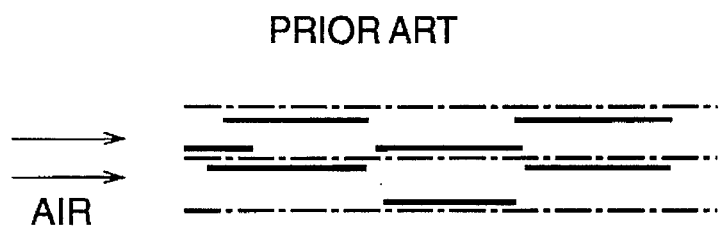
FIGS. 2a and 2b illustrate prior art strip fin type plate-fin heat exchange surfaces.
Figure 2B:
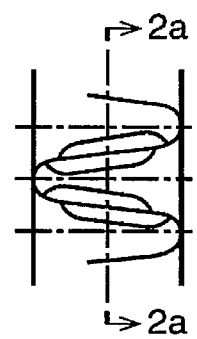
Figure 3:
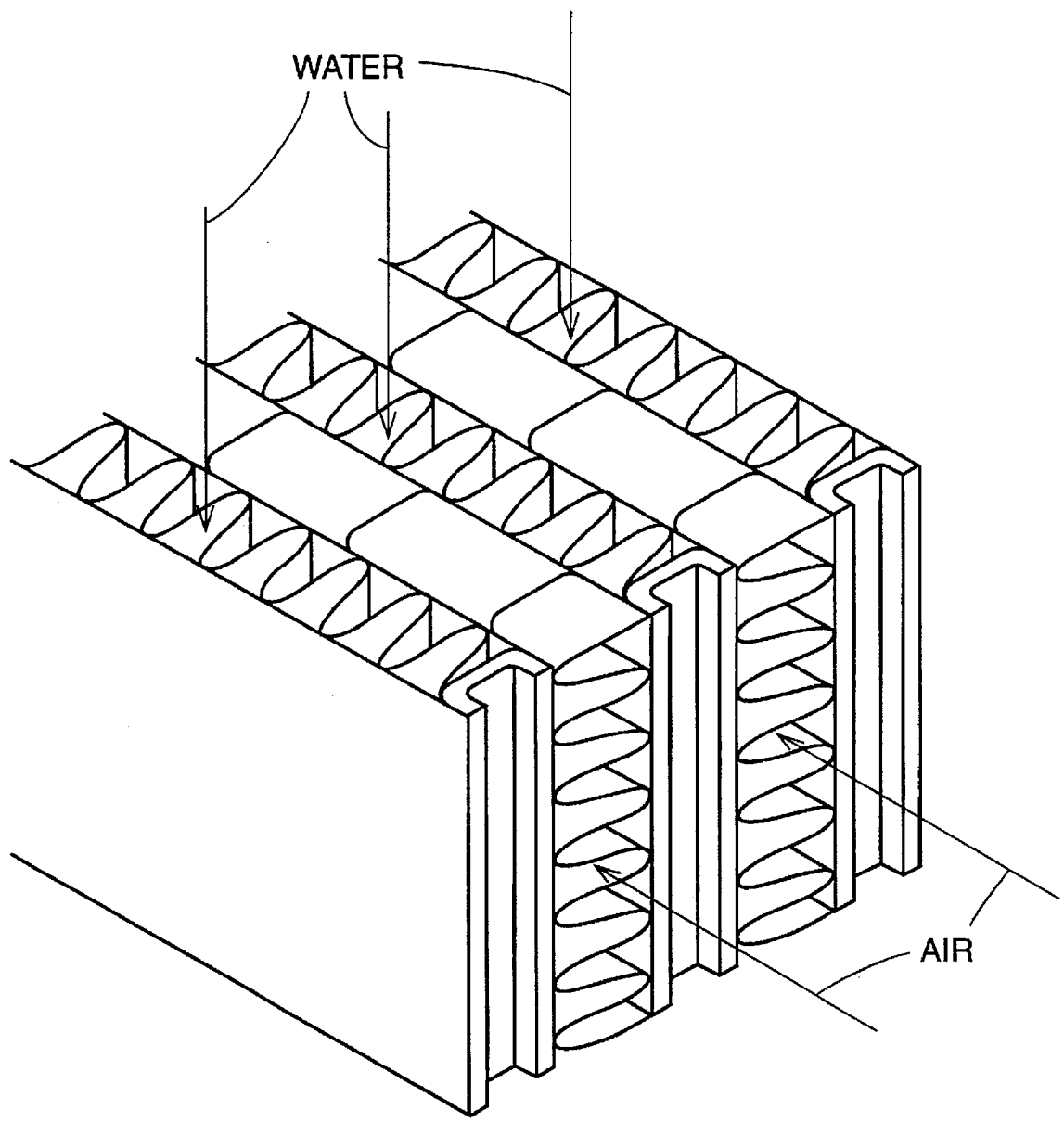
FIG. 3 schematically illustrates the cross flow of two fluids through a known type of plate-fin heat exchanger.

The heat exchanger unit 18, which uses air entraining a sprayed mist of water as the coolant medium, is shown to be of known cross-flow plate-fin construction as illustrated in FIGS. 2 and 3, wherein the liquid to be cooled flows in channels between pairs of parallel sheets (the water side) while the coolant medium comprising air carrying a mist of fine droplets flows in channels arranged alternately with the water channels between the parallel sheets (the air side). That is, flows of mist-carrying air and of water being cooled flow past opposite sides of the parallel sheets for indirect heat exchange through the sheets. By cross-flow, it is meant that the flows of water and air are essentially directed at right angles to each other in a well known mode of operation, illustrated for example in FIG. 9-3 of Kays and London, Compact Heat Exchangers, second edition, 1954 and in the accompanying FIG. 3.

Strip-fins can be employed only on the side of the heat exchange surfaces over which air carrying the water spray passes, or on both sides of the heat exchange surfaces. The strip-fins are preferably formed of copper. When strip-fins are employed on both sides of the heat exchange surfaces, a lower water spray rate can be used to produce a given cooling rate.

Figure 4:
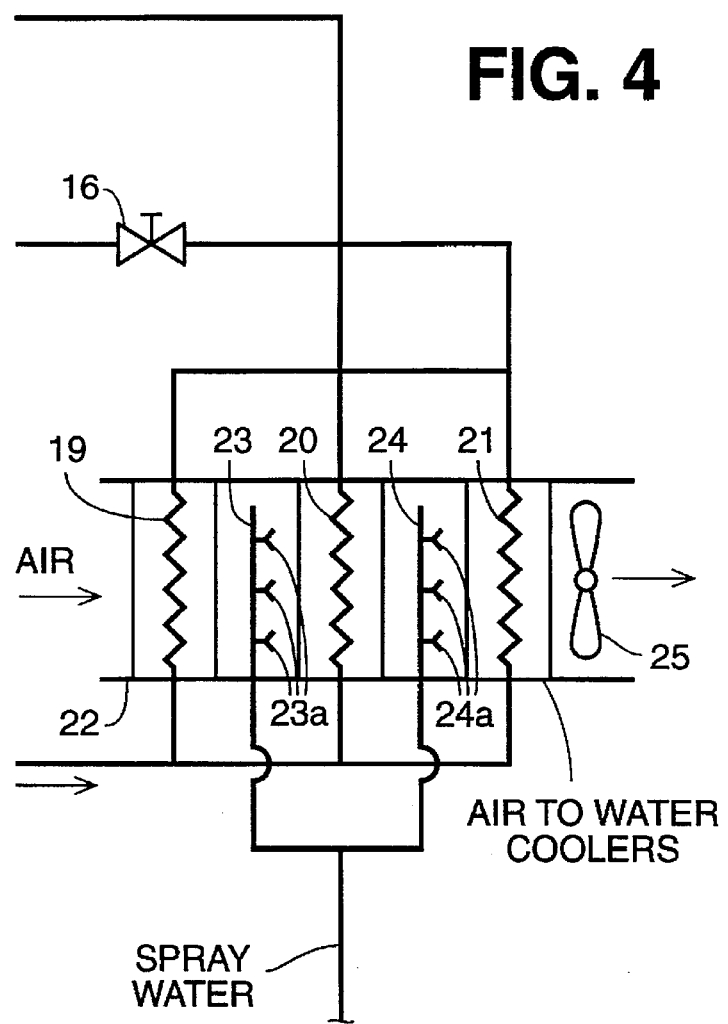
FIG. 4 shows a modified heat exchanger with three heat exchange units.

Although the heat exchange unit of the type described is illustrated in FIG. 1, in many applications more than one heat exchange unit can provide the higher cooling rates as shown in FIG. 4. The number of heat exchange units to be arranged in tandem can be determined in accordance with the cooling capacity requirements of any given application.

In certain cases, the first of a plurality of heat exchange units can be operated without any water spray, in which case, a downstream unit (or units) that is sprayed with water droplets, is more effective. Such an arrangement is shown in FIG. 4.

FIG. 4 shows an alternate form of sprayed water heat exchanger according to the invention. In the embodiment of FIG. 4 three heat exchangers in tandem are employed, rather than the single heat exchanger unit 18 shown in FIG. 1. Each of the heat exchanger units 19, 20 and 21 can have the same structure as the single unit 18 that constitutes the heat exchanger of FIG. 1, and therefore the units 19, 20 and 21 are not described in detail. The heat exchanger units 20 and 21 are shown in FIG. 4 to have their own, individually operable banks 23 and 24 of water headers and respective spray nozzles 23a, 24a. The arrangement of FIG. 4 can provide greater cooling and more flexibility than that of FIG. 1.

Experimental tests have been performed to compare the performance of similarly dimensioned tube-fin and plate-fin heat exchangers, both provided with means for spraying finely atomized droplets of water into the flow of coolant air through the heat exchangers. The results for the tube-fin heat exchanger demonstrated that the cooling capacity could be increased by a factor of four times that of the same heat exchanger with no water spray. Test results for the plate-fin heat exchanger demonstrated that the cooling capacity of the exchanger with sprayed water droplets exceeded by a factor of eight times that of the same heat exchanger with no water spray.

The test heat exchangers represented approximately one-thirtieth of full scale air side frontal area of the heat exchanger which would actually be employed in an alternate spent fuel cooling system for a nuclear power generating plant, but the results are believed to demonstrate that either tube-fin or plate-fin air cooling heat exchangers augmented by spraying atomized water droplets having a mean diameter of 250 microns or less into the cooling air can be used for the purpose of the invention.

The water spray can be produced by use of suitable high inlet pressure, hydraulic or air atomizing spray nozzles such as those available from suppliers such as Spraying Systems Co. of Wheaton, Ill. The nozzles can be arranged on headers that are opened and closed by solenoid valves for control of the amount of water sprayed. That is, one or more of a plurality of spray headers can be activated to provide the desired spray flow. Preferably the nozzles have built-in strainers. When the air flow through the heat exchanger is directed horizontally, the nozzles are arranged to spray water droplets concurrently with the air flow while the flow of water to be cooled on the water side of the plates is in a direction perpendicular to the direction of the flow of cooling air. Other arrangements will suggest themselves to those acquainted with the art of heat transfer.

What is claimed is:

1. A method for cooling water from a spent fuel pool of a nuclear power generating plant comprising withdrawing water to be cooled from the spent fuel pool and passing the water to be cooled to and through a heat exchanger for transferring heat from the water to be cooled flowing on one side of a heat exchanger surface of the heat exchanger to a coolant medium flowing on the other side of the heat exchanger surface, comprising causing a flow of air as coolant medium to pass through said heat exchanger while spraying a fine mist of droplets of water into the flow of air to enhance the cooling capacity of the air.

2. The method of claim 1 including causing water from said fine mist of droplets of water to collect on said heat exchange surface as a thin film and evaporating water from said thin film to enhance overall heat transfer.

3. The method of claim 2 and including evaporating at least about one-third of the water sprayed into the heat exchanger within said heat exchanger.

4. The method of claim 1 including causing the flow of air by sucking ambient air through the heat exchanger with a fan.

5. The method of claim 1 comprising spraying the fine mist of droplets into the flow of air through a plurality of spaced nozzles.

6. The method of claim 5 including controlling the spraying of the fine mist by selectively activating only some nozzles of said plurality of nozzles.

7. The method of claim 1 wherein said droplets of water have a mean diameter of about 250 microns or less.

8. The method of claim 1 wherein said droplets of water have a mean diameter of about 150 microns or less.

9. The method of claim 1 wherein said droplets of water have a mean diameter of about 50 microns.

* * * * *